(12) United States Patent
Cabuz et al.

(10) Patent No.: US 6,351,054 B1
(45) Date of Patent: Feb. 26, 2002

(54) COMPOUNDED AC DRIVING SIGNAL FOR INCREASED RELIABILITY AND LIFETIME IN TOUCH-MODE ELECTROSTATIC ACTUATORS

(75) Inventors: Cleopatra Cabuz; Eugen I. Cabuz, both of Edina, MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/591,170

(22) Filed: Jun. 9, 2000

Related U.S. Application Data

(63) Continuation-in-part of application No. 08/948,337, filed on Oct. 9, 1997, now abandoned.

(51) Int. Cl.$^7$ ................................................ H02N 1/00
(52) U.S. Cl. ...................................... 310/309; 318/116
(58) Field of Search ........................ 310/309; 318/116; 361/225

(56) References Cited

U.S. PATENT DOCUMENTS 5,176,358 A * 1/1993 Bonne et al. ............. 251/30.05
5,768,007 A * 6/1998 Knipe et al. ................ 359/290
5,901,939 A * 5/1999 Cabuz et al. .......... 251/129.02

FOREIGN PATENT DOCUMENTS

EP 0865151 * 9/1998 ................. 310/309

WO 00/28651 * 5/2000 ................. 310/309

* cited by examiner

Primary Examiner—Karl Tamai
(74) Attorney, Agent, or Firm—John G. Shudy, Jr.

(57) ABSTRACT

An electrostatic actuator device and method for actuating the device. The device includes a pair of actuator plates having electrodes for conducting a voltage potential thereto and at least one of the pair being movable with respect to the other. The plates are positioned to move upon application of a voltage potential through electrodes attached thereto. A driving means provides a voltage potential to the electrodes to cause the movement of the at least one plate. The driving means produces compound AC signal with rise/fall sections at least 10 to 100 times (preferably more than twenty times) the mechanical response time of the actuator. The preferred AC signals are selected from square-wave, sine wave, triangle wave and mixtures thereof. The preferred circuit produces rise/fall sections that are a quarter of a full period of the AC wave signal, and only the nominal section of the compound AC signal is used for driving the actuator. Preferred is an actuation cycle having a rise section with the signal amplitude increasing from zero to the desired final value through a plurality of individual periods of the a AC signal and a fall section with the signal amplitude decreasing from a nominal final value to zero through a similar plurality of individual periods of basic AC signal. The specific frequency of the square wave AC signal and the rise fall times of the amplitude modulation is adjusted to minimize stiction between said actuator plates.

23 Claims, 8 Drawing Sheets

COMPOUNDED AC DRIVING SIGNAL FOR INCREASED RELIABILITY AND LIFETIME IN TOUCH-MODE ELECTROSTATIC ACTUATORS

This is a continuation-in-part application of Ser. No. 08/948,337 filed Oct. 9, 1997 which is now abandoned.

FIELD OF THE INVENTION

The present invention relates to a driving device and method for driving electrostatic actuators. More particularly the invention relates to a driving device and method using a compounded AC signal.

BACKGROUND OF THE INVENTION

Electrostatic actuators have become selected and are the solution of choice for actuators that employ low power, operate at high speed, require low cost to produce, and are of small size. These devices present significant advantages: over thermal devices by requiring much less power; over electromagnetic devices using less power and having smaller size; or piezoelectric actuators that have a higher cost and have a much smaller amplitude of motion.

To date, however, there are no commercially available electrostatic actuators. Of particular concern are electrostatic actuation in the presence of dielectrically isolated electrodes, where specific problems are incurred.

In electrostatic actuators, the desired displacement is the result of the attractive electrostatic force generated by the interaction between a distribution of opposite sign charges placed on two bodies, one of which is moveable. For the purposes of this invention, these two bodies are known as actuator plates. The actuator plates are placed apart by a predetermined distance. The charge distribution is then generated by applying a potential difference between two conductive electrodes that are part of the actuator plates. The actuator will be in the ON state or mode when a potential difference is applied between the electrodes and the two plates move toward each other. The actuator will be in the OFF state when the electrodes are at the same potential (shorted).

A DC voltage is theoretically capable of inducing the "ON" state of the actuation cycle. Practical problems, however, limit the application of a DC voltage for the actuation of some electrostatic actuators. In real devices, DC driving shows memory effects, such that the behavior of the actuators depends strongly on the history of the actuation process. DC driving also induces stiction (1) through charges injected in the dielectric at the dielectric/metal electrode interface, and (2) through charges trapped at the dielectric/air interface.

Using an AC signal for inducing the ON state of an electrostatic actuator is also possible and it can remove the drawbacks of the DC driving.

Sine wave AC drive has been considered and found to have some detrimental properties. Sine wave AC drive does not generate the steady level of electrostatic pressure required in many applications. The displacement of the actuator plate/plates tends to follow the sine wave applied voltage, resulting in an undesired vibratory motion when the AC sine wave voltage is applied. To overcome this drawback a multiphase/multielectrode driving scheme can be used. This method results however in complicated structures and limited force. Square wave AC driving can provide high and steady electrostatic forces. However, it can also produce premature stiction that adversely affects performance sooner than would permit many practical devices to operate with reasonable life expectancy.

One family of patents describes fluid control employing micro miniature valves, sensors and other components using a main passage between one inlet and exit port and additionally a servo passage between inlet and outlet ports. The servo passage is controlled by a control flow tube such that tabs are moved electrostatically. U.S. Pat. No. 5,176,358 to Bonne et al teaches such a fluid regulating device, while divisional U.S. Pat. Nos. 5,323,999 and 5,441,597 relate to alternative embodiments.

The actual electrostatic device is only briefly described in the above patents, wherein at least one tab formed as part of a dielectric layer moves toward and away from an aperture upon activation of a means for varying the potential of at least one electrode associated therewith to generate an electrostatic force.

The above referenced patents identify another family of patents for further information on microvalves using electrostatic forces. The pending U.S. patent application referred to in those first discussed patents has matured into U.S. Pat. No. 5,082,242 to Bonne et al. This patent describes a microvalve that is an integral structure made on one piece of silicon such that the device is a flow through valve with inlet and outlet on opposite sides of the silicon wafer. The valves are closed by contact with a valve seat where surfaces must be matched in order to avoid degradation of valve performance. Two patents, U.S. Pat. Nos. 5,180,623 and 5,244,527 are divisional patents relating to the first patent. These patents generally describe operation of the electrostatic valve as being driven by various kinds of voltage sources. Specifically, the valve is said to operate as a two position valve with fully open and fully closed positions by applying a DC voltage between electrodes. Also, operation as a proportional control valve is disclosed as being effected by applying a voltage proportional to the voltage necessary to close the valve. Finally, These patents describe operation of the valve with a pulse width modulated voltage signal to modulate gas flow through the valve.

In some electrostatic actuators, the actuator plates have to come in intimate contact during the normal operation cycle. These actuators are sometimes referred to as touch-mode electrostatic actuators. In order to prevent electrical shorting during the touch phase of the operation cycle, the conductive electrodes are isolated from each other by dielectric layers. In order to get the maximum work from a specific device, large electric fields are usually developed between the two conductive electrodes. The non-linear character of the electrostatic attraction results in a snapping action, where the actuator plates move toward each other with accelerations as high as $10^8$ g and speeds that exceed $10^3$ m/sec. After the impact, the free surfaces of the actuator plates are pushed against each other by the large electrostatically generated pressure. This operation mode creates the possibility of very large mechanical impact and strong interaction forces being developed between the actuator plates. Some of these forces can continue to act after removal of the potential difference between the actuator plates. In some cases, these forces are stronger than the restoring forces available for bringing the electrodes in their original position. In such a case, the two electrodes remain temporarily or permanently attached and the actuator stops functioning as intended and desired. This condition is sometimes referred to as 'stiction.'

The main forces producing stiction in electrostatic actuators are surface interaction forces (solid bridging, Van der Waals forces, hydrogen bonds) and electrostatic forces produced by charges permanently or temporarily trapped into the dielectrics. To reduce the surface interaction forces, two approaches may be used. The first, reducing the contact area, requires more sophisticated structures and gives up some of the available electrostatic force. The second, reducing the surface energy of the layers in contact, has not yet been successfully demonstrated for devices based on that concept.

During the lifetime of an actuator, the large mechanical impact and the large electrostatic pressure can gradually increase the real contact area between the actuator plates and enhance the surface interaction forces.

It would be of great advantage to the art if this buildup could be reduced or avoided altogether.

It would be another great advance in the art if an improved driving method for electrostatic actuators could be provided for use with any actuator and configuration of the physical components thereof.

Other advantages will appear hereinafter.

SUMMARY OF THE INVENTION

It has now been discovered that the above and other objects of the present invention may be accomplished in the following manner. Specifically, the present invention comprises an actuator drive producing a compounded AC signal with three different sections, called Section I or the Rise Section, Section II or the Normal Section, and Section III or the Fall Section. The normal section will serve as the actual force generating section while the rise and fall sections will serve as transition sections between the zero signal and the nominal amplitude of the AC signal. This drive results in an overall increase of the actuator life time as a result of reducing charging and reducing the mechanical impact at the contact between actuator parts. The signals used in the different sections may be square-wave, sine wave, triangular wave or mixed signals.

The device is used in electrostatic actuators that have at least one pair of actuator plates and electrodes for conducting a voltage potential thereto. At least one of the pair is movable with respect to the other. The plates are positioned to move upon application of a voltage potential through the electrodes. A driving means provides a voltage potential to the electrodes to cause the movement of the at least one plate.

The driving means of this invention produces a compounded AC signal with the following structure. The signal in section II or the nominal section is a square wave AC signal. This signal is able to generate a steady electrostatic force. The amplitude and the frequency of this signals are selected according to the mechanical and electrical characteristics of the particular application. An example of the above signal would be: amplitude of the square wave AC signal 60 V peak-to-peak and frequency of 250 Hz. In some applications, where life time requirements are modest (several hundreds of thousands of actuations cycles) this section of the signal can stand alone.

The signals in sections I and III do not have to generate a significant electrostatic force but to ensure a slow increase/decrease of the amplitude of the electrical signal. The increase/decrease can be considered slow if the time for the signal to go from zero to its maximum value is at least 10 to 100 times longer than the mechanical response time of the actuator. In this way, the displacement of the actuator will be able to follow the applied voltage. Signals satisfying these requirements are the amplitude modulated square wave, sine wave or triangular wave signals. The amplitude modulation can follow a desired time dependence such as, but not limited to, a linear exponential or sinusoidal function. The number of cycles of the AC signal in sections I and III can be varied according to the response time and power requirements of the particular application. A preferred embodiment is to have more than 20 cycles.

When sine wave or triangular wave signals are used in section I and/or III of the compounded signal, that section can be reduced to a quarter of a full AC cycle. This allows a significant reduction of the response time and of the power consumption of the device, keeping at the same time the advantages of reduced mechanical impact and reduced charging.

The preferred circuit produces an actuation cycle having an amplitude increasing from zero to the desired final value through a plurality of individual periods of the basic AC signal and an amplitude decreasing from a nominal final value to zero through a similar plurality of individual periods of the basic AC signal.

The detailed structure of the rise/fall sections and the frequency of the AC signal can be modified over a wide range of values to fit the speed and power requirements of the specific application. It is intended that the specific frequency of the AC signal and the times of the rise/fall sections be adjusted to minimize stiction between said actuator plates.

BRIEF DESCRIPTION OF THE DRAWINGS

For a more complete understanding of the invention, reference is hereby made to the drawings, in which.

DETAILED DESCRIPTION OF THE PREFERRED EMBODIMENT

The present invention provides an improved electrostatic actuator with thousands of times the life operating time when compared with an identical actuator driven with a DC signal and more than 20 times when compared with a regular square wave signal.

The micromechanical structures which are the object of the invention can be in one of the following two states: the "open" state, or the state where the two plates of the actuator are separated by an air gap, and the "closed" state, where the two plates are essentially in contact. In order for the moving plate to move from the open into the closed state, a minimum actuation voltage must be applied between the two plates. Once this voltage is applied to the plates, the time taken by the moving plate to travel from the essentially open position to the essentially closed position is called the mechanical response time of the actuator. This time is determined by the particular structure of the actuator plates and the environmental fluid (which can be gas, liquid or vacuum) and can be measured for each particular device through optical or electrical means.

Figure 1:
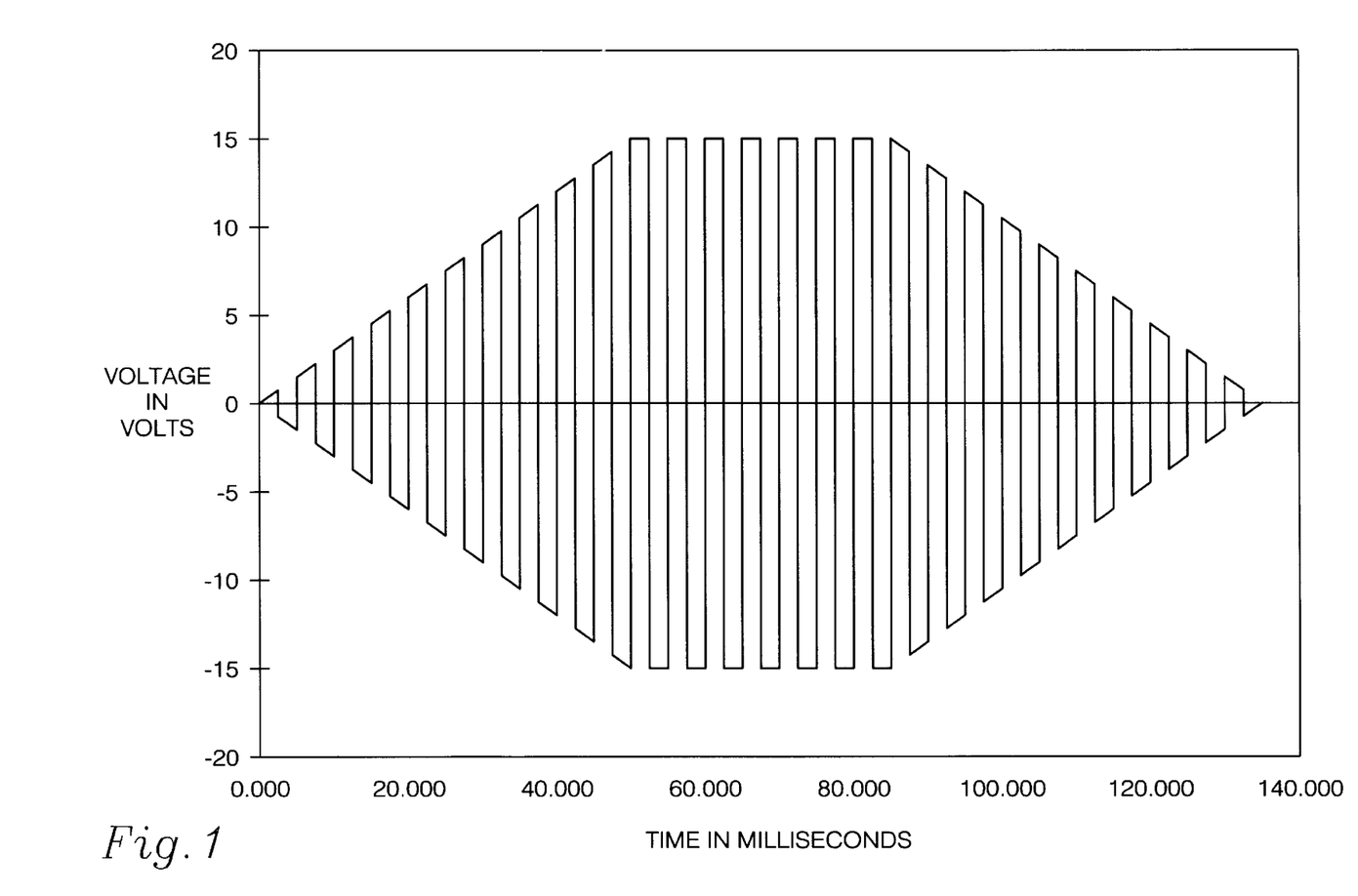
FIGS. 1–5 and 7 are graphical illustrations of voltage over time, illustrating various driving signals to be used in electrostatic actuators, all in accordance with this invention.

As shown in FIG. 1, the shape of the driving signal of the present invention is a signal compounded of three different sections: the rise section comprising a square-wave AC signal with a linearly increasing amplitude; the nominal section comprising a regular square wave signal with constant amplitude; the fall section comprising a square wave AC signal with a linearly decreasing amplitude. The time of the rise and fall sections of the signal is substantially longer than a period of the AC signal. This results in reduced charging and reduced mechanical impact at the contact between the actuator parts.

As can be seen in FIG. 1, the square-wave signal has a rise section of about 50 milliseconds (ms) and is much longer than one period of the signal. The fall section, also of about 50 ms, is extended for a similar time compared to the period of the signal.

Figure 2:
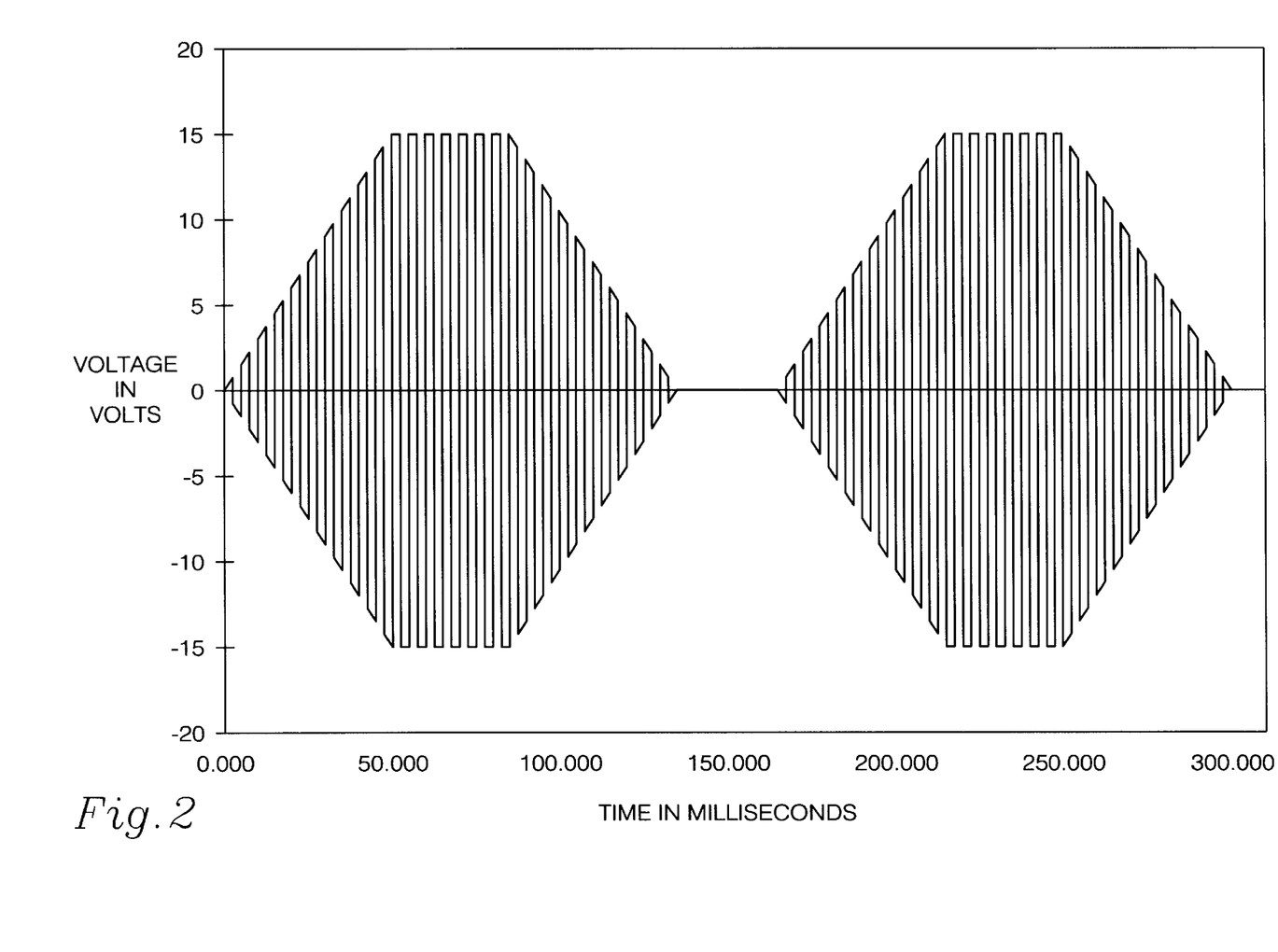
Figure 3:
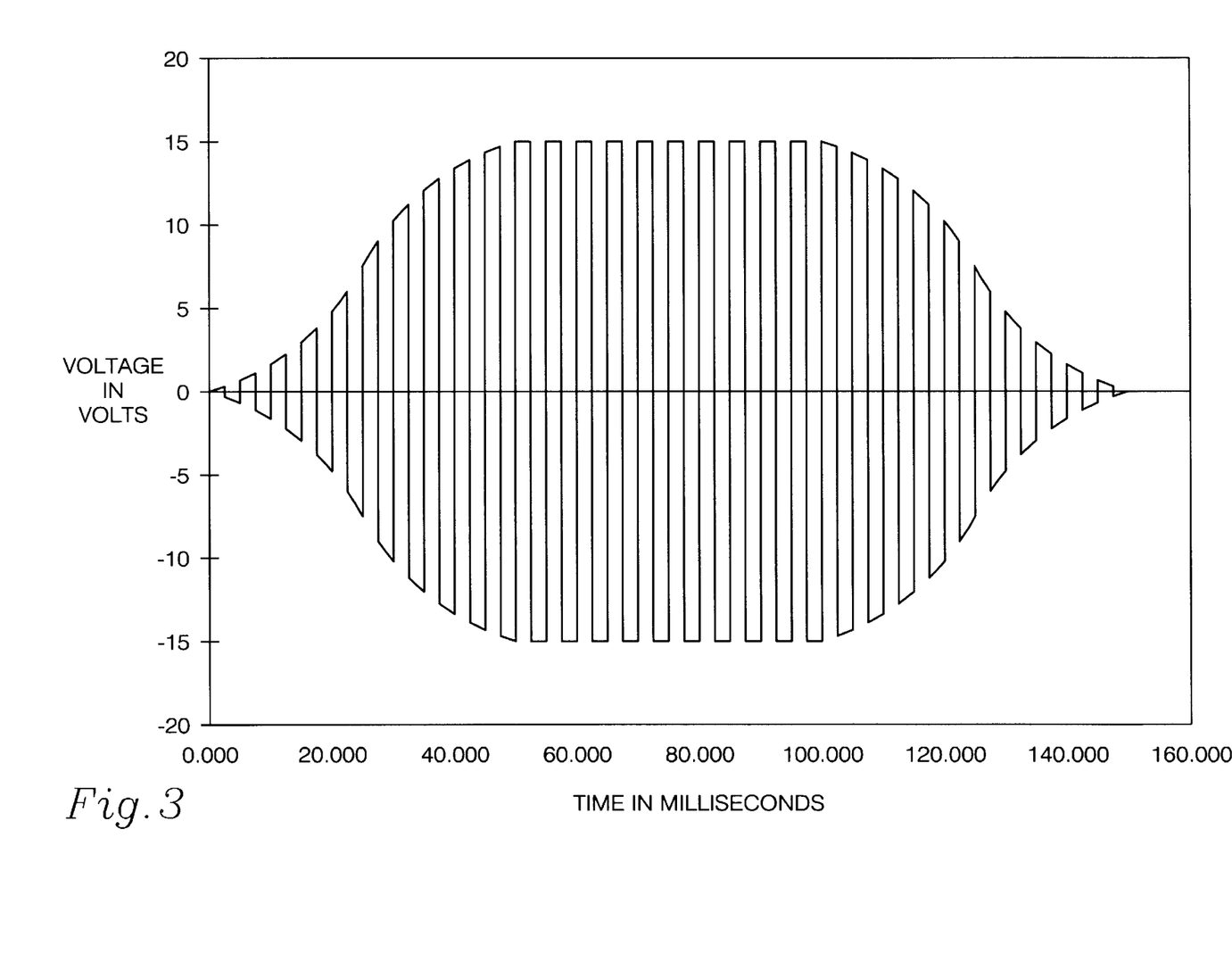
Figure 4:
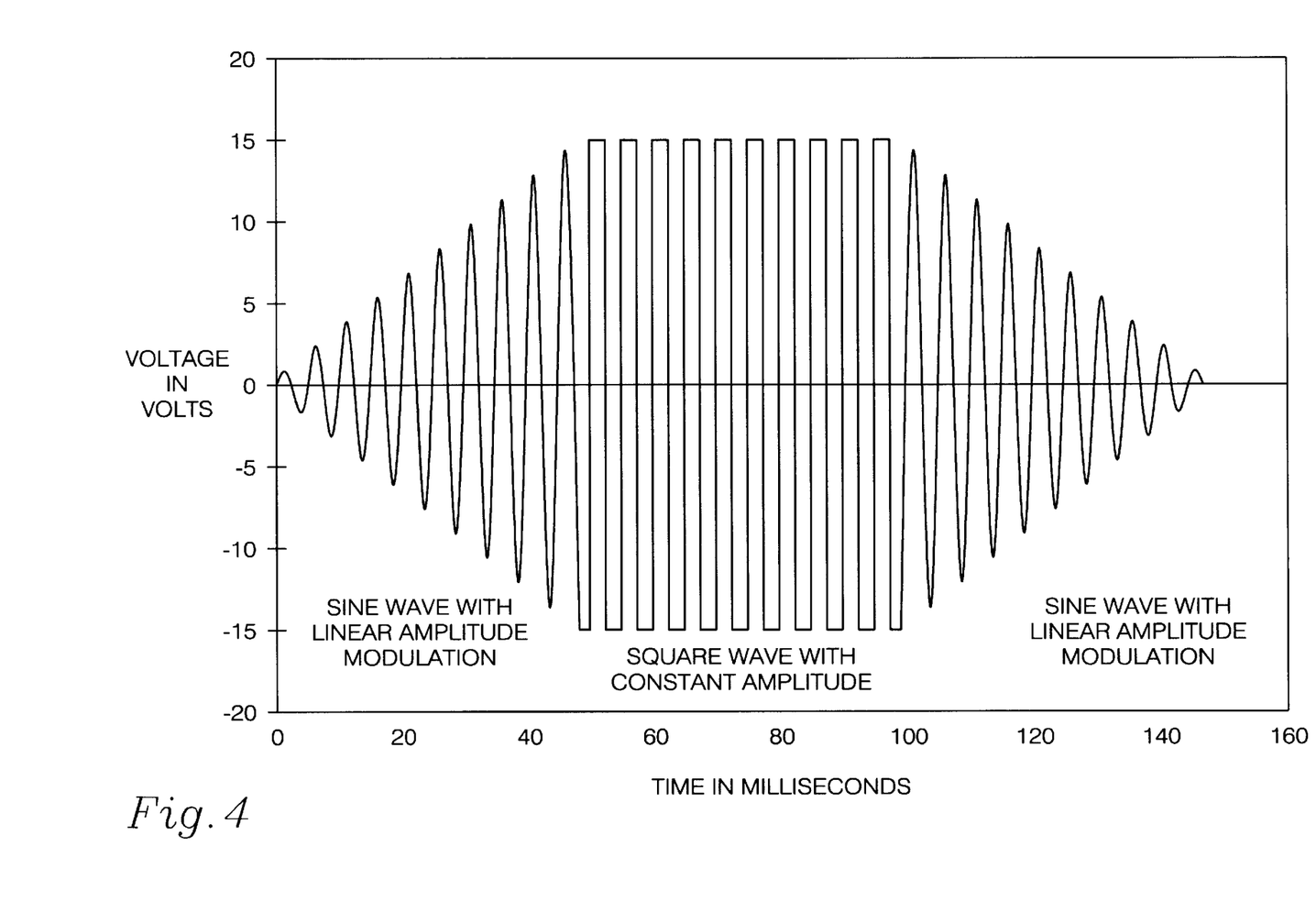
Figure 5:
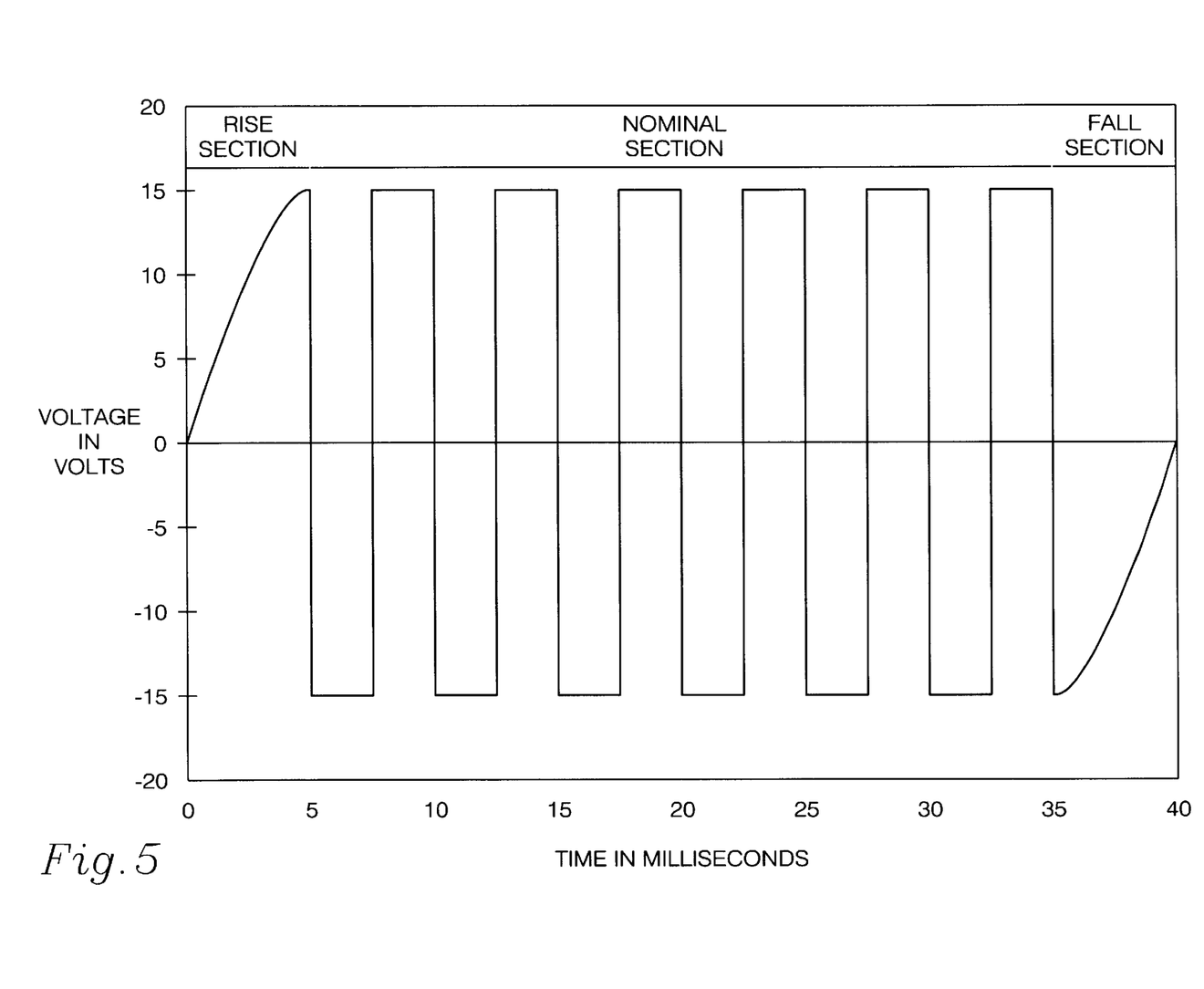
Figure 7:
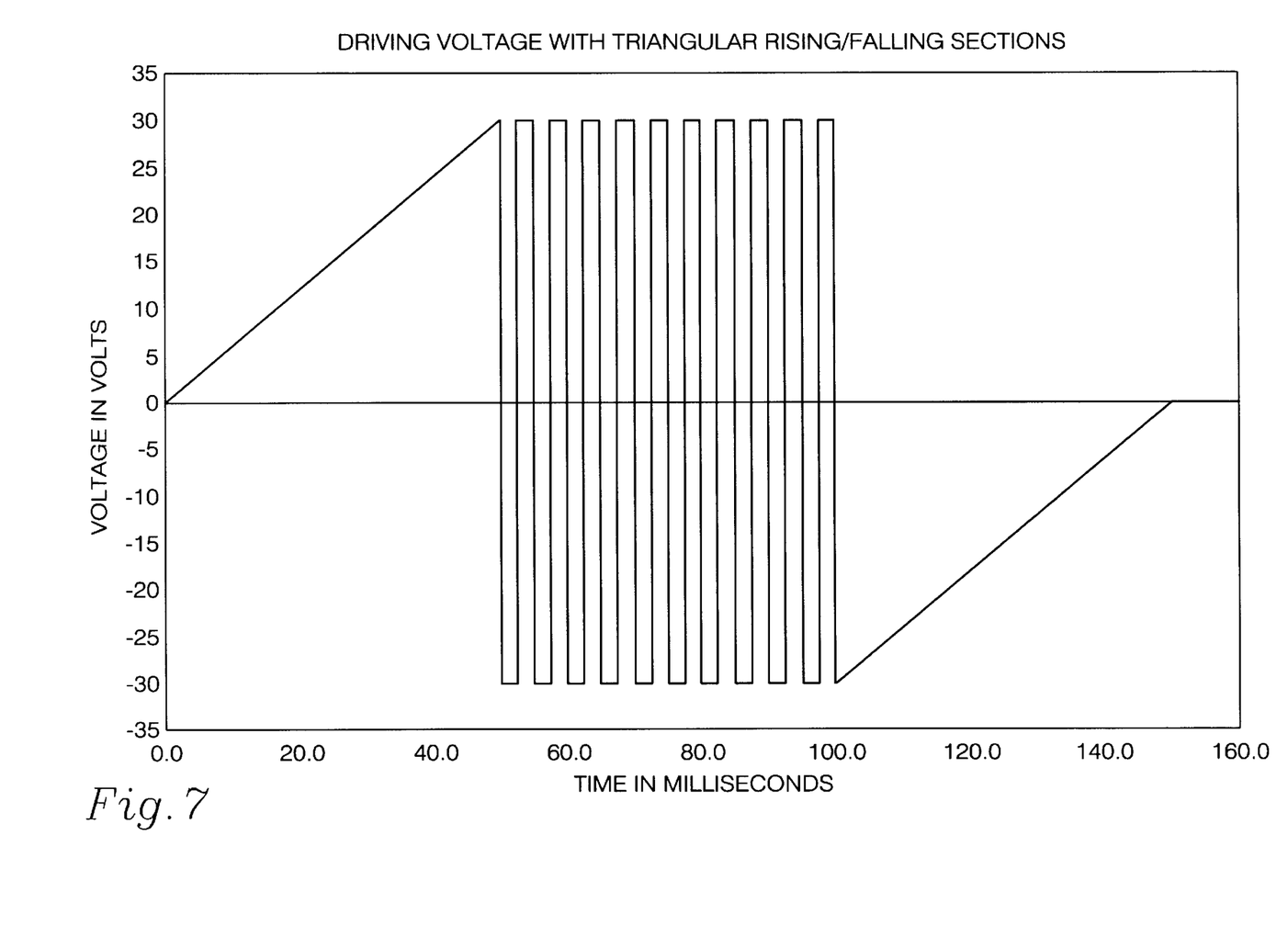

FIG. 2 illustrates a similar graphical representation of a linear amplitude modulation, this time showing a change in the phase of the signal at each subsequent ON state of the actuation cycle. Long rise and fall sections compared to the period of this signal is also clearly shown. FIG. 3 is an alternative embodiment in which a sinusoidal amplitude modulation is illustrated, again with long rise/fall sections compared to the period of the signal. FIG. 4 illustrates a combined sine/square wave driving voltage with linear amplitude modulation, all in accordance with the invention. FIG. 5 illustrates the particular case of the compounded sine/square wave driving voltage where the rise and the fall sections of the signal are realized each through only one quarter of a full AC cycle. FIG. 7 illustrates the particular case of a driving voltage with triangular rising/falling sections.

The driving signal frequency and amplitude the time of the rise/fall sections of the compound signal can be adjusted in a wide range according to the application of the invention to a specific device. While not serving as limitations on the scope of variations, one example is a square wave frequency of 250 Hz with a peak-to-peak amplitude of 70V and rise/fall times of 0.1 seconds each. Alternatively, as an example only, a square wave frequency of 1.6 kHz and rise/fall times of 0.02 seconds each can be used. In each case, the specific values for frequency, amplitude and rise/fall times will be determined by the specific application of the invention.

In accordance with the invention, and the signal generated thereby, the time of the rise/fall sections can be between one quarter of a period of the driving signal and several times the period of the AC signal. It is preferred that the rise/fall times be at least twenty times longer, as this assists in reducing the mechanical impact at the onset of the actuation voltage and allows improved charge evacuation at the removal of the actuation voltage. This has not been possible prior to the present invention.

While a variety of circuits may be used to generate the signals of the present invention, the circuit must be able to start an actuation cycle with an amplitude increasing from zero to the desired final value through a sufficient number of individual periods of the basic AC signal. The end of each actuation cycle also must go through a decrease of the amplitude of the AC signal from the nominal value to zero, again through a sufficient number of periods of the basic AC signal.

Figure 6:
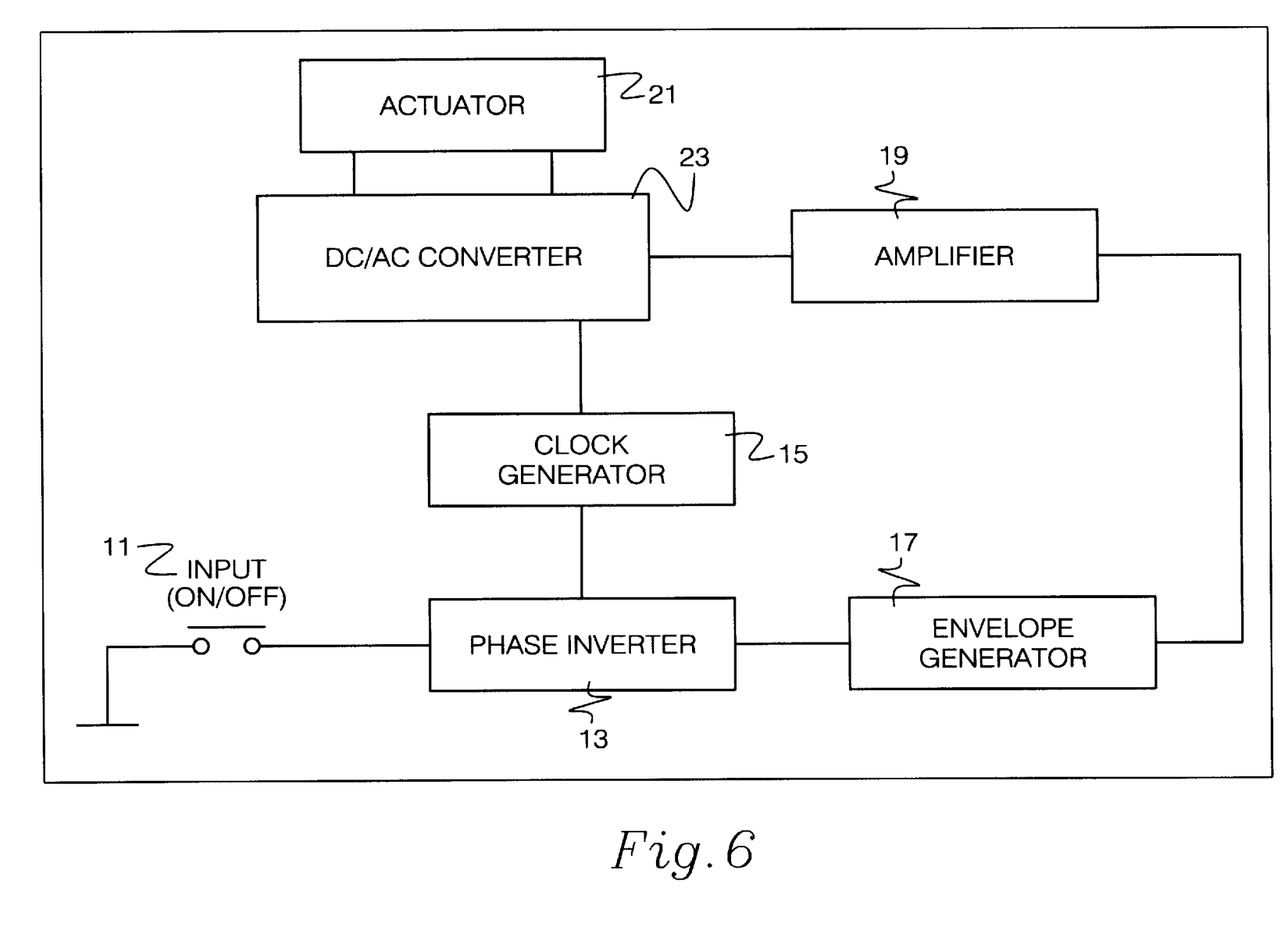
FIG. 6 is a block diagram of one embodiment demonstrating implementation of the driving circuit of this invention.

FIG. 6 illustrates implementation of one circuit that has been used to generate a desired driving signal in accordance with the present invention, though the invention is not limited in any way by this particular circuit.

The signal generated by the circuit of FIG. 5 has a frequency of the square wave of 250 Hz. The nominal amplitude of the square wave is 70 volts peak-to-peak. The rise time and fall time are both 0.1 seconds. The modulating frequency used to produce the actual motion of the actuator is about 1 Hz.

As shown in FIG. 6, the voltage at input 11 is subjected to phase inversion 13, which signal then reaches both clock generator 15 and envelope generator 17. The signal from the envelope generator 17 is amplified 19 and processed into the actuator 21 by DC/AC converter 23, subject to the signal from clock generator 15. Such a device was used to produce the signals shown in FIGS. 1–4 and to operate the tests set forth below.

Figure 8:
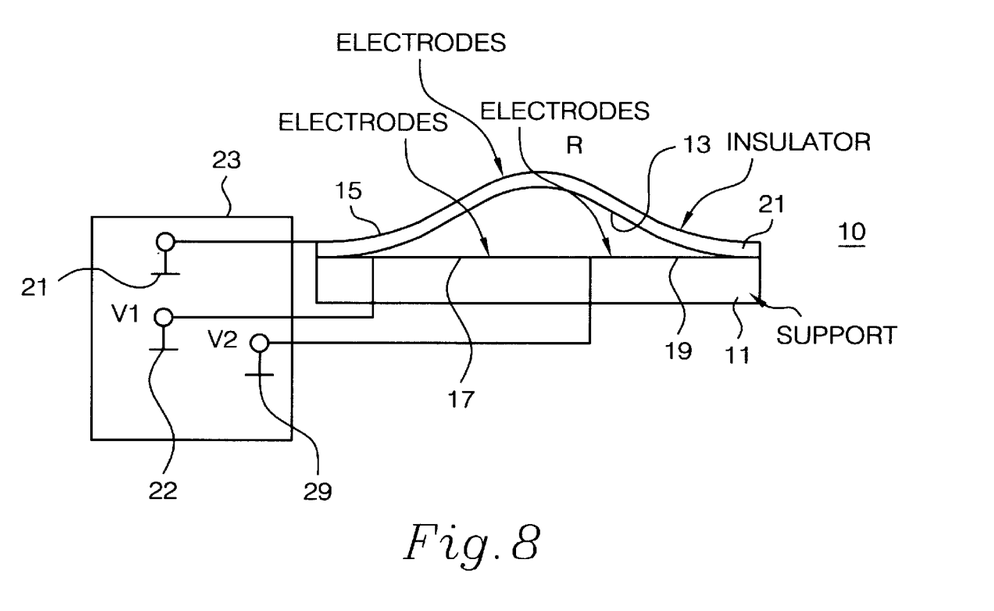
FIG. 8 is a schematic view of an actuator of the type used in the present invention.

FIG. 8 illustrates the actuator 10, generally, includes a stationary support 11 to which is fastened a buckled support 13. Buckled support 13 is supported at both ends on to stationary support 11, and is longer than the distance between supports. A preferred method of forming this buckled support 13 is by sacrificial layer etch, a commonly known semiconductor processing technique. When released, the bridge will form a bubble.

A first electrode 15 is formed on buckled support 13 and a second and third electrodes 17 and 19 are formed on the stationary support. Non conducting insulation 21 is placed on the first electrode 15, or on the two electrodes 17 and 19 on support 11, or on both to insure no electrical conductivity.

The actuator 10 in FIG. 8 has a voltage supply means 23, which in this embodiments comprises a voltage source 25 connected to first electrode 15, a second voltage source 27 connected to second electrode 17 and a third voltage source 29 connected to third electrode 19. In the idle state, the voltage at source 27 equals voltage source 29, and both are at zero volts. When an operating voltage 27 for electrode 17 is applied, the left side of bridge support 13 is pulled down so that electrodes 15 and 17 are in electrostatic (but electrically insulated) contact.

To demonstrate the efficacy of the present invention, six identical touch mode electrostatic actuators were prepared, each as an array of 25 individual flaps that were actuated at a 1 Hz. actuation rate. Six devices were driven: (1) three with the driving signal of the present invention as illustrated in FIG. 1; and (2) three with a regular square wave having rise and fall times shorter than the mechanical response time of the actuator, and much smaller than the period of the AC driving signal. The devices driven by the signal of the present invention went through over 8,000,000 ON/OFF cycles without any failure of any kind. The compared devices driven with the regular square wave showed non-synchronous movement of 90% of the flaps. Eventually, stiction was observed in 60% of the flaps after only 400,000 cycles. There was massive failure after about 350,000 cycles, where 30% of the flaps failed during the first 350,000 cycles and another 30% failed during the next 50,000 cycles. Similar devices driven with a DC voltage show stiction after a few actuation cycles. This is substantial proof that the present invention does in fact reduce mechanical impact and stiction.

As will become apparent from the foregoing detailed description, the present invention is admirably suited for use in almost any electrostatic actuators. Of particular advantage in touch mode application, the invention is useful in electrostatic actuators used as valves, pumps, switches, shutters, wobble motors, and many similar devices. Such devices will have a far superior ability to function and last over a longer period of time because of the present invention's ability to reduce mechanical impact between actuator plates and reduce stiction by selection of an optimum driving voltage. While particular embodiments of the present invention have been illustrated and described, it is not intended to limit the invention, except as defined by the following claims.

What is claimed is:

1. An electrostatic actuator, comprising;
a pair of actuator plates having electrodes for conducting a voltage potential thereto and at least one of said pair being movable with respect to the other, said plates being positioned to move upon application of a voltage potential thereto by electrodes attached thereto; and
driving means for providing a voltage potential to said electrodes to cause said movement, said driving means producing a compound AC signal with rise/fall sections at least 10 times the mechanical response time of the actuator.

2. The device of claim 1, wherein the rise/fall sections are a quarter of a full period of said AC signal.

3. The device of claim 1, wherein only the nominal section of the compound AC signal is used for driving the actuator.

4. The device of claim 1, wherein said AC signal is selected from square-wave, sine wave, triangular wave and mixtures thereof.

5. The device of claim 1, wherein said driving means is a driving circuit, said circuit producing an actuation cycle having a rise section with the signal amplitude increasing from zero to the desired final value through a plurality of individual periods of the basic AC signal.

6. The device of claim 1, wherein said driving means is a driving circuit, said circuit producing an actuation cycle having a fall section with the signal amplitude decreasing from a nominal final value to zero through a plurality of individual periods of the basic AC signal.

7. The device of claim 1, wherein said driving means is a driving circuit, said circuit producing an actuation cycle having a rise section with the signal amplitude increasing from zero to the desired final value through a plurality of individual periods of the basic AC signal and a fall section with the signal amplitude decreasing from a nominal final value to zero through a similar plurality of individual periods of a basic AC signal.

8. The device of claim 1, where said electrostatic actuator is a touch-mode electrostatic actuator.

9. In a touch-mode electrostatic actuator having a pair of actuator plates having electrodes for conducting a voltage potential thereto and at least one of said pair being movable with respect to the other, said plates being positioned to move upon application of a voltage potential thereto by electrodes attached thereto, and further having a driving means for providing a voltage potential to said electrodes to cause said movement, the improvement comprising:
providing a driving means adapted to produce a compounded AC signal with rise/fall sections at least 10 times the mechanical response time of the actuator.

10. The device of claim 9, wherein the rise/fall sections are a quarter of a full period of said AC signal.

11. The device of claim 9, wherein only the nominal section of the compound AC signal is used for driving the actuator.

12. The device of claim 9, wherein said AC signal is selected from square-wave, sine wave, triangular wave and mixtures thereof.

13. The device of claim 9, wherein said driving means is a driving circuit, said circuit producing an actuation cycle having an amplitude increasing from zero to the desired final value through a plurality of individual periods of the basic AC signal.

14. The device of claim 9, wherein said driving means is a driving circuit, said circuit producing an actuation cycle having an amplitude decreasing from a nominal final value to zero through a plurality of individual periods of a basic AC signal.

15. The device of claim 9, wherein said driving means is a driving circuit, said circuit producing an actuation cycle having an amplitude increasing from zero to the desired final value through a plurality of individual periods of a basic AC signal and an amplitude decreasing from a nominal final value to zero through a similar plurality of individual periods of a basic AC signal.

16. A method of driving an electrostatic actuator having a pair of actuator plates having electrodes for conducting a voltage potential thereto, at least one of said pair being movable with respect to the other, said plates being positioned to move upon application of a voltage potential thereto by electrodes attached thereto, comprising the steps of:
providing a voltage potential to said electrodes to cause said movement, said driving means producing a compounded AC signal with a rise section at least 10 times mechanical response time of the actuator and a fall time at least 10 times the mechanical response time of the actuator.

17. The method of claim 16, wherein the rise/fall sections are a quarter of a full period of said AC signal.

18. The method of claim 16, wherein only the nominal section of the compound AC signal is used for driving said touch mode actuator.

19. The method of claim 16, wherein said AC signal is selected from square-wave, sine wave, triangular wave and mixtures thereof.

20. The method of claim 16, wherein said signal produces an actuation cycle having an amplitude decreasing from a nominal final value to zero through a plurality of individual periods of a basic AC signal.

21. The method of claim 16, wherein said signal produces an actuation cycle having an amplitude increasing from zero to the desired final value through a plurality of individual periods of a basic AC signal and an amplitude decreasing from a nominal final value to zero through a similar plurality of individual periods of a basic AC signal.

22. The method of claim 16, including the step of adjusting the frequency of the square wave AC signal and the rise fall times of the amplitude modulation to minimize stiction between said actuator plates.

23. The method of claim 16, wherein said signal produces an actuation cycle having an amplitude increasing from zero to the desired final value through a plurality of individual periods of a basic AC signal.

* * * * *